3,161,522
CONTINUOUS LAUTERING OF BREWERS' WORT
John Compton, 8 Jarvis St., R.R. 4,
London, Ontario, Canada
Filed Oct. 4, 1961, Ser. No. 142,877
Claims priority, application Canada, Dec. 30, 1960,
814,019
3 Claims. (Cl. 99—52)

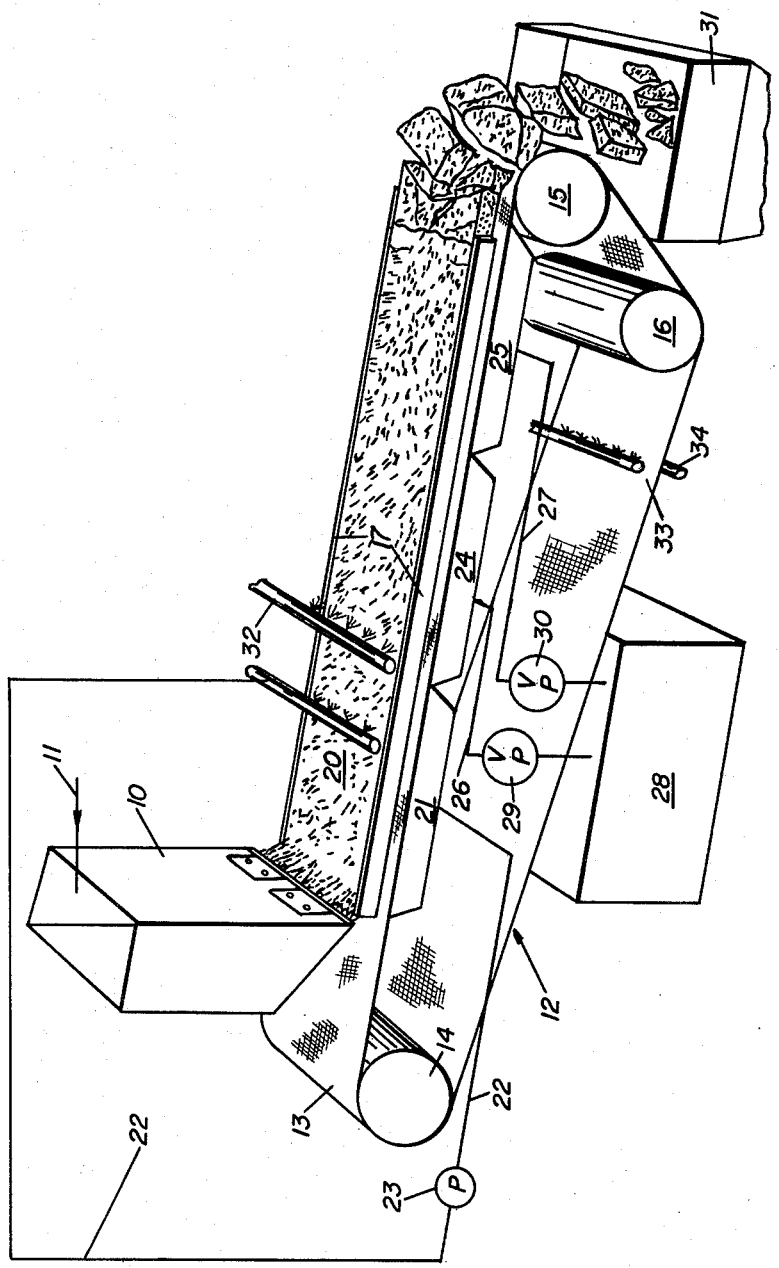

This invention relates to a method of lautering, i.e., straining and recovery of wort liquid from mash grains in the brewing of beer. Lautering has been one of the most critical of the numerous operations involved in brewing and has heretofore required a great amount of skill and experience on the part of the operator to produce quality beer without lost time.

Traditional lautering is carried out in lauter tuns which are provided with a perforated plate, or so-called false bottom, which carries the filtering bed, which bed is made up of coarse grains of the mash which have settled and formed a bed above the perforated plate. The filtering thus takes place actually between the grains rather than through the perforations of the plate. The narrow space below the false bottom is kept full of liquid at all times to stop the bed from "setting" or "plugging." This setting or plugging occurs when the filtrate is drawn off so rapidly that the grain fibers and colloidal particles are compressed together and thus plug up the normal pores in the grain bed. To maintain this liquid seal below the bed is a difficult and cumbersome operation. The nature of normal lautering operating and the difficulties attendant therewith are outlined in the introductory part of United States Patent 2,948,661, which issued to Union Machine Company, as assignee of P. J. O'Neill, Jr., on August 9, 1960.

With the lautering methods and apparatus of the prior art it has not been feasible to attempt to speed the lautering process by applying a vacuum which would increase the rate of flow of the filtrate (wort) through the filter bed made up of grains of mash, but I have now made the surprising and valuable discovery that vacuum can be applied to speed the lautering procedure, and the use of the false bottom and flooded space below, which characterized lautering techniques of the prior art, can be wholly eliminated by practicing the novel method of my invention.

This method may generally be defined as a method of continuous lautering which comprises the steps of feeding a mixture of grains and wort liquid from a mashing operation in a brewing process onto the upper flight of a moving continuous perforated belt at a point adjacent one end of said upper flight, regulating the speed of said belt, and the rate of feed of the mash thereonto, to form a filtering bed of grains on said belt, collecting a filtrate of clear wort liquid which has passed downwardly through said grains and through the upper flight of said perforate belt, subjecting the filtering bed to water-spraying to sparge out residual sugar values and removing said bed of grains from said belt in the region of the other end of said upper flight.

Preferably suction is applied to part of the underside of said upper flight of said belt to speed the filtering operation. I also presently prefer to recycle the filtrate passing through the region of the bed adjacent the feed end of the belt.

The attached drawing is a schematic illustration of the method of the invention and shows in perspective view one apparatus suitable for carrying out the process.

In the drawing, 10 indicates a feed box and 11 is a line delivering fresh mash to the box. Beneath the box is a continuous belt 12 having a horizontal upper flight 13, the belt being trained over and driven by rollers 14, 15 and 16, roller 15 being a driven roller and rollers 14 and 16 idler rollers. The mash in the feed box 10 is deposited on the upper flight 13 of the belt and is confined by a square U-shaped member 17 so as to be carried along by the moving belt in the form of a rectangle which is almost as wide as the belt.

As the deposited mash 20 moves along the belt some of the water associated with it falls freely through the grains and the perforated screen and enters a collection box 21 disposed below the upper flight 13. The material which collects in this collection box 21 is preferably recycled to the deposited material 20 by means of a line indicated at 22 and a pump 23.

As the deposited material 20 moves further along the belt away from the feed box 10 it is brought over a second collection box 24 and a third collection box 25. The boxes 24 and 25 are connected by lines 26 and 27 respectively with a wort collection tank 28. Interposed in the lines 26 and 27 are vacuum pumps 29 and 30 respectively, whereby the process of drawing off the wort filtrate may be speeded up by applying suction to the underside of part of the flight 13.

The dried bed of material breaks away from the upper flight 13 as the latter turns downwardly to follow the contour of the driven roller 15. The dried grains are collected in a box 31, whence they may be taken to make various by-products of the brewing industry but are no longer used in the brewing process proper. For greater extraction of sugar these grains may, if desired, be repulped in fresh water, and filtered on a second lautering unit.

As the material 20 passes along on the upper surface of the upper flight 13 of the conveyor 12 it is subjected to a water wash by spraying from above whereby to sparge out residual sugar values in the grain bed. The means for delivering the water wash is indicated at 32 in the drawings and is preferably located above the vacuum box 24 and adjacent the feed end thereof. Several spray bars can be used depending upon the completeness of washing required.

The lower flight of the belt 12 is washed from above and below with water to remove any grain material still adhering to the belt. The washing means used for this purpose are indicated at 33 and 34 respectively.

The size of the perforations in the moving belt does not appear to be at all critical, provided they are of a size which will retain coarse grain fibers. Perforations of from 0.2 to 3.0 millimeters appear to be useful. A filter cloth or a wire mesh can be employed as the perforated belt as well as conventional belting and when I speak of a belt I mean to include a length of wire mesh or filter cloth as well as conventional belting. The perforated belt can travel at speeds of from 0.1 to 1.5 feet per minute and wort filtrate flow rates of from 0.2 to 0.8 barrel per hour per square foot of filter surface can be anticipated, including allowances for cake washing.

The grain bed depth can vary from one to 12 inches, although it is presently preferred not to exceed 8 inches. The suction applied can vary from 0 to 10 inches of mercury.

A typical set of data from experimental runs made with a pilot plant for testing the method of the invention is set out below in tabular form.

[Test data on six runs using moving grain bed to filter wort]

| Run Number | 1 | 2 | 3 | 4 | 5 | 6 |
|---|---|---|---|---|---|---|
| Feed, lb./hr | 1,000 | 1,000 | 1,000 | 1,000 | 1,000 | 700 |
| Filter cloth opening, inches | 0.018 | 0.10 | 0.10 | 0.10 | 0.10 | 0.10 |
| Belt speed, ft./min | 0.27 | 0.27 | 0.27 | 0.42 | 0.33 | 0.27 |
| Vacuum in first box, inches of Hg | 3 | 3 | 3 | 3 | 0 | 1 |
| Vacuum in second box, inches of Hg | 3 | 3 | 3 | 3 | 5 | 9 |
| Length of gravity section, inches | 10 | 7 | 7 | 7 | 7 | 10 |
| Recycle from gravity section,[1] gal./hr | 12 | 10 | 10 | 10 | 10 | 15 |
| Grain bed depth in inches | 3¾ | 3¾ | 3¾ | 2⅞ | 3⅛ | 2¾ |
| Malt Mill setting in inches | 0.022 | 0.030 | 0.022 | 0.022 | 0.022 | 0.022 |
| Clarity (Wet centrifuged solids percent) | 0.20 | 0.22 | 0.14 | 0.40 | 0.22 | 0.24 |
| Flow rate 1st vacuum box, bbls./hr./sq. ft | 0.60 | 0.55 | 0.63 | 0.58 | 0.50 | 0.47 |
| Flow rate 2nd vacuum box, bbls./hr./sq. ft | 0.40 | 0.50 | 0.52 | 0.58 | 0.50 | 0.54 |

[1] In this table where the term "length of gravity section" is employed, that section of the bed which overlies the collection box 21 is being referred to.

The apparatus and method described above may be altered in various ways without departing from the basic concepts of the present invention. Thus, for example, a vacuum could be applied to all or only one of the collection boxes; or the material collected in box 24 could be recycled. Furthermore, the number of collection boxes could be increased and the filtrate from one box could be employed to wash the part of the deposited material passing over the preceding box. Thus fresh water would only be added above the collection box at the discharge end of the upper flight, while the wort would only be drawn off for further processing from the box at the feed end of the flight.

What I claim as my invention is:

1. A continuous lautering process which comprises the steps of forming into a continuous moving layer a slurry of grains and wort liquid from a mashing operation in a brewing process, the speed of the continuous layer and the rate of feed of mash being regulated to form a filtering bed of grains of substantially uniform depth, said bed being between about 1 inch and 12 inches in depth, moving said filtering bed successively through a first filtration zone and a second filtration zone, collecting by gravity a filtrate which has passed downwardly through said bed of grains in said first zone, applying suction to the underside of said bed to collect a filtrate of clear wort liquid in said second zone and spraying the filtering bed with water to sparge out residual sugar values in said second zone.

2. A continuous method as defined in claim 1, in which at least some of the filtrate passing through the said bed of the belt is recycled to the top of the bed.

3. A continuous process as defined in claim 2, wherein the filtrate from said first zone is recycled to the top of said bed prior to water sparging.

References Cited in the file of this patent

UNITED STATES PATENTS

| | | |
|---|---|---|
| 1,967,310 | Kent | July 24, 1934 |
| 2,127,759 | Silhavy | Aug. 23, 1938 |
| 2,314,294 | Wallny | Mar. 16, 1943 |
| 2,673,176 | Whitney | Mar. 23, 1954 |
| 2,961,316 | Cook et al. | Nov. 22, 1960 |